United States Patent [19]

Baurmeister

[11] Patent Number: 4,940,617

[45] Date of Patent: Jul. 10, 1990

[54] MULTILAYER HOLLOW FIBER WOUND BODY

[75] Inventor: Ulrich Baurmeister, Wuppertal, Fed. Rep. of Germany

[73] Assignee: Akzo NV, Netherlands

[21] Appl. No.: 166,458

[22] Filed: Mar. 10, 1988

[30] Foreign Application Priority Data

Mar. 10, 1987 [DE] Fed. Rep. of Germany .... 3707584[U]
Feb. 8, 1988 [DE] Fed. Rep. of Germany ... 3803693[U]

[51] Int. Cl.$^5$ ............................................. B65H 81/00
[52] U.S. Cl. .................................... 428/36.3; 428/113; 428/222; 428/246; 428/253; 428/284; 428/257; 428/292; 428/398; 428/192; 428/376
[58] Field of Search ................ 428/113, 222, 284, 398, 428/257-258, 36.3, 253, 246, 298, 192; 156/148, 167

[56] References Cited

U.S. PATENT DOCUMENTS

| | | | |
|---|---|---|---|
| 3,422,008 | 8/1969 | McLain | 210/32 |
| 3,536,611 | 10/1970 | De Filippi et al. | 210/22 |
| 3,690,465 | 9/1972 | McGinnis et al. | 264/41 |
| 3,794,468 | 2/1974 | Leonard | 23/258.5 |
| 4,140,637 | 2/1979 | Walter | 210/321 R |
| 4,172,794 | 10/1979 | Sigdell | 210/232 |
| 4,343,668 | 8/1982 | Francisoud et al. | 156/172 |
| 4,350,549 | 9/1982 | Frehner | 428/398 |
| 4,533,089 | 11/1985 | Lewiner et al. | 324/71.1 |

FOREIGN PATENT DOCUMENTS

| | | |
|---|---|---|
| 0041467 | 6/1981 | European Pat. Off. . |
| 0093677 | 11/1983 | European Pat. Off. . |
| 2300312 | 7/1973 | Fed. Rep. of Germany . |
| 7911220 | 7/1973 | Fed. Rep. of Germany . |
| 2441333 | 8/1974 | Fed. Rep. of Germany . |
| 2721444 | 11/1978 | Fed. Rep. of Germany . |
| 2825065 | 12/1979 | Fed. Rep. of Germany . |
| 3236946 | 9/1982 | Fed. Rep. of Germany . |
| 207607 | 3/1984 | Fed. Rep. of Germany . |
| 233946 | 3/1986 | Fed. Rep. of Germany . |
| 1481064 | 7/1977 | United Kingdom . |

Primary Examiner—James J. Bell
Attorney, Agent, or Firm—Oliff & Berridge

[57] ABSTRACT

A multilayer hollow fiber wound body, in which at least a portion of the hollow fibers is formed as helices and/or a portion of the hollow fibers as spirals. The hollow fibers within each hollow fiber ply are disposed at regular intervals to each other. The hollow fibers of adjacent, successive hollow fiber plies cross. The hollow fibers are disposed in the form of at least two superposed and then spirally wound hollow fiber mats, the hollow fibers within each hollow fiber mat being held by several inserted transverse fibers or the like. Within each hollow fiber mat the regular interval between the transverse fibers or the like is greater than the regular interval between the hollow fibers, and none of the hollow fibers has a deflection site, whereby according to the invention the ratio of the regular interval between adjacent transverse fibers within each hollow fiber mat to the regular interval between adjacent hollow fibers within each hollow fiber mat falls in the range of 2 to 40.

11 Claims, 8 Drawing Sheets

MULTILAYER HOLLOW FIBER WOUND BODY

TECHNICAL FIELD

The invention relates to a multilayer hollow fiber wound body, in which at least one portion of the hollow fiber is formed as helices and/or a portion of the hollow fibers as spirals. The hollow fibers within each hollow fiber ply are disposed at regular intervals to each other. The hollow fibers of adjacent, successive hollow fiber plies cross. The hollow fibers are disposed in the form of at least two superposed and then spirally wound hollow fiber mats. The hollow fibers within each hollow fiber mat are held by several inserted transverse fibers or the like. Within each hollow fiber mat the regular interval between the transverse fibers or the like is greater than the regular interval between the hollow fibers, and none of the hollow fibers has a deflection site. The invention also relates to a process for the production of the hollow fiber wound body, as well as to the use of the hollow fiber wound body.

BACKGROUND

Hollow fiber wound bodies are known, which are produced by the winding of a hollow fiber onto a spool. This type of production is very costly and offers only limited design options for the hollow fiber wound bodies that can be produced in this manner.

Multilayer hollow fiber wound bodies made of a spirally wound woven material or knitted material, made of hollow fibers, are also known. In this type of hollow fiber wound bodies, kinking of the hollow fibers at crossing points can occur. In addition, the production of woven and knitted materials from hollow fibers is costly.

A multilayer hollow fiber wound body is known from European Patent EP No. 81 0,093,677; the disclosed body can be produced by rolling up several layers of superposed, mutually crossing hollow fibers into a spiral form. The individual hollow fiber layers of this wound body are thus subsequently disposed in a spiral form, whereby the hollow fibers are not held by several transverse fibers. Because of the resulting absence of adequate cross mixing, convective heat or mass transport into the extra-capillary compartment in this known hollow fiber wound body leaves much to be desired. In addition, it appeared in practice that the originally regular arrangement of the hollow fibers is greatly disrupted by further processing, so that gaps form, which result in channeling, because of shifting and juxtaposing of hollow fibers. The disclosed production process is moreover very costly and offers only limited design options for the hollow fiber wound body. In addition, some hollow fibers in these hollow fiber wound bodies have deflection sites, which arise at the cylinder end because of the reversal of the traversing movement during the wrapping of the polygonal cylinder with hollow fibers. The hollow fibers can be damaged at the deflection sites by this means, i.e., become loose or even break.

A hollow fiber wound body is known from Unexamined West German Patent Application (DE-OS) No. 2,300,312, in which a plurality of layers of hollow fibers are disposed over one another on a core, whereby mutually adjacent hollow fibers proceed essentially parallel to each other within each individual layer, whereas adjacent hollow fibers of adjacent, successive hollow fiber layers cross at an angle in each case. Production proceeds by the winding of a hollow fiber also over the ends of a core in several layers, thus not by spiral winding of a hollow fiber fabric. This type of production of a hollow fiber wound body is very costly and results in a high proportion of waste, because the hollow fiber segments wound on the ends of the core must be discarded. Moreover, the absence of transverse fibers or the like not only produces inadequate cross mixing in the extra-capillary compartment, but also a very irregular structure of the hollow fiber wound body, because the generally very smooth hollow fibers slip out of place even during the production of the hollow fiber wound body, which leads to the juxtaposing of very many hollow fibers or hollow fiber sections; on the one hand, this results in channeling, and on the other, in the covering of a large portion of the surface effective in heat or mass transfer.

A hollow fiber membrane apparatus is known from East German Patent (DD-PS) No. 233,946; the apparatus is produced by preparation of webs of parallel hollow fibers, preferably by sewing, winding of the webs into a fiber bundle, and formation of connections. The fiber bundle is wound up of at least two webs, whereby the hollow fibers of adjacent webs are mutually disposed at an angle of 10° to 80°; this is preferably achieved in that the webs are obliquely deformed outward from the edges. The lateral interval between seams is thereby relatively large, so that in this known hollow fiber membrane apparatus as well, adjacent hollow fibers touch each other after the webs are wound into a fiber bundle; this leads to channeling and the covering of the membrane surface and consequently to deterioration in heat and/or mass transfer.

SUMMARY OF THE INVENTION

The present invention has as an object the provision of a multilayer hollow fiber wound body of the aforementioned type, the hollow fibers of which are disposed at a regular lateral interval along the entire length and which for this reason assures improved convective heat and/or mass transport and increased heat and/or mass transfer, and which offers more combination and design options relative to the arrangement of hollow fibers and can be produced in a simple manner.

It has now been found that only when the ratio of the regular lateral interval between adjacent transverse fibers within each hollow fiber mat to the regular lateral interval between adjacent hollow fibers within each hollow fiber mat falls within a certain range, a juxtaposing of adjacent hollow fibers is avoided with certainty. The interstices between adjacent transverse fibers and adjacent hollow fibers, in this case, are sufficiently large to ensure good perfusion of the hollow fiber wound body with a suitably low pressure loss. As is generally known, hollow fibers, which were wound into a bobbin before being processed into a hollow fiber mat, can be formed as waves. Such hollow fibers have an especially great tendency for mutual contact, if they are processed into a hollow fiber mat and the lateral distance of transverse fibers is too large. This circumstance was apparently not considered to date, for which reason the regular lateral interval between transverse fibers in known hollow fiber wound bodies made of such mats was selected to be relatively large.

BRIEF DESCRIPTION OF THE DRAWINGS

The invention will be described more extensively with reference to the figures, in which.

DETAILED DESCRIPTION OF PREFERRED EMBODIMENTS

Figure 1:
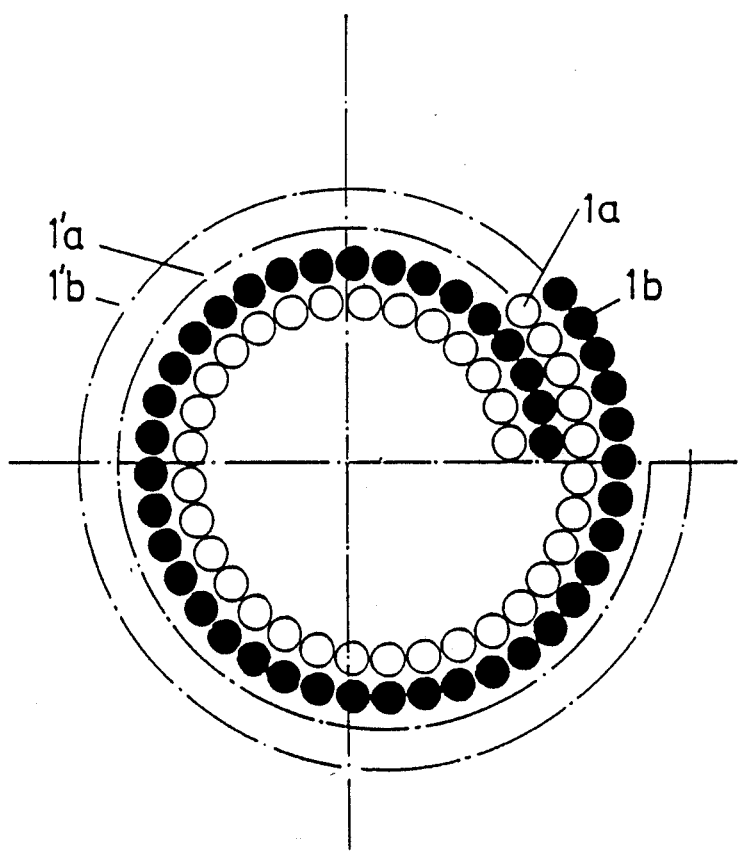
FIG. 1 shows an embodiment of the hollow fiber wound body in section.

The lateral interval between adjacent hollow fibers within each hollow fiber mat in terms of the present invention is understood to be the interval in the immediate region of the transverse fibers, because it is essentially established in this region.

The regular lateral interval between adjacent transverse fibers or adjacent hollow fibers need not be identical within a hollow fiber mat, as long as each interval ratio falls within the novel range. Likewise the regular intervals between adjacent transverse fibers or hollow fibers of the different hollow fiber mats forming the hollow fiber wound body need not be identical, thus equivalent to each other.

To determine the interval ratio, the lateral intervals between adjacent transverse fibers and adjacent hollow fibers are determined in the same segment of the hollow fiber mat. The transverse fibers and hollow fibers, used in measuring the interval ratio, essentially form a rectangle or parallelogram and the lateral intervals between transverse fibers or hollow fibers correspond to the intervals between the opposite sides of the rectangle or parallelograms formed by them.

The novel hollow fiber wound body is suitable for the treatment of liquid, vaporous, and gaseous media.

The novel hollow fiber wound body can have a cross section filled with hollow fibers or a ring-shaped cross section with a central axial perfusion channel or a ring-shaped cross section with a core filling the central axial cavity. In this case, this can refer to a solid core, which totally fills the central axial cavity, or to a tubular core forming the central axial perfusion channel. The hollow fiber wound body can also be formed to be flat in cross section. This type of flat hollow fiber wound body is obtained, for example, by winding hollow fiber mats onto a core with a flat shape (plate). The cross section of the core in so doing preferably has the form of a rectangle with rounded corners, a segment of a circle or semi-circle with rounded edges, a lens, an ellipse or a sickle with rounded edges. These types of core shapes produce space-saving hollow fiber wound bodies or those that are better adapted, for example, to the body surface of a patient. For the tubular design of the core, whereby this can also have one of the aforementioned cross-sectional forms, the wall (sheath) of the core can also have breaks to enable, for example, radial perfusion of the hollow fiber wound body.

Helical in terms of the present invention is defined as "the form of a steep helix in relation to the longitudinal axis of the fiber wound body, thus the form of a helix with a large helix angle." This has the effect that the length of hollow fibers thus formed is essentially not greater than the length of the hollow fiber wound body.

Spiral in terms of the present invention is defined as "the form of a spiral arranged in a plane lying essentially perpendicular to the longitudinal axis of the fiber wound body." This has the effect that depending on the number of the hollow fiber plies and the hollow fiber layers and depending on the length of the hollow fiber wound body, the spiral hollow fibers can also have a length that is essentially different from the length of the hollow fiber wound body.

The terms hollow fiber ply and hollow fiber mat are defined as follows: hollow fiber mat is a flat, single-layer arrangement of hollow fibers, the said mat in which the hollow fibers are held by fiber-shaped or band-shaped or similarly formed means proceeding obliquely relative to the hollow fibers. A hollow fiber ply is defined as a fiber mat section wound in the production of the hollow fiber wound body per complete revolution of the said body. If, for example, two hollow fiber mats are thus wound on a single core, in that 10 full rotations are permitted, then a hollow fiber wound body is obtained, which has a total of two times ten, thus 20, hollow fiber plies.

A hollow fiber layer is defined as a wound hollow fiber mat.

Within a hollow fiber layer or mat, the hollow fibers need not absolutely be arranged parallel to each other, although, as a rule, this might be the most feasible design.

The transverse fibers or the like, keeping the hollow fibers at the regular intervals from each other, can, for example, be introduced by a weaving or knitting process thus, for example, as so-called warp or filling threads. To improve the convective heat or mass transport, the hollow fibers and/or transverse fibers are preferably structured and/or shaped. If, for example, textile multifilament fibers are used, then these are preferably textured. The transverse fibers should preferably be guided rather loosely around the hollow fibers to avoid angularly inflexible linkage or constriction of the hollow fibers by the transverse fibers.

The hollow fibers of adjacent successive plies of the hollow fiber wound body can also be formed as uniformly helical, but they then have a variable length, by virtue of the condition that they cross. Generally, the hollow fibers of adjacent successive plies are helical in opposite directions or alternately helical and spiral or alternately helical and rectilinear (axially parallel) or alternately spiral and rectilinear. However, three or more layers of variably formed hollow fibers can also alternate, i.e., be arranged in successive plies. For example, alternately helical, spiral, and rectilinear hollow fibers or alternately two plies of hollow fibers, which are helical in the opposite direction, and a ply of spiral or rectilinear hollow fibers. In each case, however, only those hollow fibers cross that do not belong to the same hollow fiber layer.

The hollow fiber wound body can have hollow fibers that are suitable for heat transfer and/or hollow fibers that are suitable for mass transfer, mass exchange and- /or material separation. Hollow fibers, differing relative to their properties and/or their dimensions and/or their form, can also be disposed together in a hollow fiber wound body. For example, heat transfer from a medium A to a medium B can be effected by hollow fibers suitable for this, whereas at the same time mass transfer from medium B to a medium C and/or vice versa can occur with the use of hollow fibers suitable for this. Microporous hollow fibers can also used for mass transfer. The pores of the hollow fibers can be also be filled with suitable substances for this purpose; the interior of the hollow fibers, i.e., the lumen, can also be filled.

The hollow fibers of the wound body can also differ relative to their matter transport properties. For example, they can have different selectivities or semipermeabilities for different substances, be hydrophilic or hydrophobic, be porous or have no pores, etc.

Differences in form, for example, can consist in the fact that in one portion of the hollow fibers the external contour, thus the outline of the hollow fibers, in cross section is formed essentially round or circular and that in another portion of the hollow fibers the external contour in section is triangular, square, three-lobed, four-lobed, etc.

Differences can also exist in hollow fiber diameters and hollow fiber lengths. The hollow fibers can also have differently shaped lumen cross sections and/or wall thicknesses.

The hollow fiber wound body is therefore suitable for the production, for example, of filters, oxygenators, hemofilters, blood plasma separators, IV filters, crossflow microfilters, gas separators, membrane distillation devices, bioreactors, adsorbers, absorbers, desorption agents, dialyzers, exchange columns, packing for packed columns, controlled slow release of active substances, odorous substances, and the like, etc. For this purpose, the hollow fiber wound body, as is also known for prior art hollow fiber wound bodies, can be placed in a suitable housing, which has the necessary connections for supplying and removing the media involved in heat and/or mass transfer.

The two end regions of the hollow fibers of the novel hollow fiber wound body can be embedded or introduced into a curable casting material—as is also typical for prior art hollow fiber wound bodies and hollow fiber bundles. Removal of a sufficiently long section of the cured casting material achieves the situation that the hollow fibers with their open ends open onto the outer surface of the so-called tube sheet arising thereby. The hollow fiber wound body thus formed can then be used like a filter cartridge in a housing with connections for fluids. The sealing of the hollow fiber end regions can occur, however, only after the hollow fiber wound body is placed in a housing with connections for fluids, so that the casting material itself effects the fluid-impervious seal with the housing. This is also known from the state of the art and therefore does not need to be explained further here.

In flowing around the hollow fibers of the hollow fiber wound body in the longitudinal direction, the fluid in question is frequently brought to the end of the hollow fiber wound body generally radially and removed again radially at its other end, generally on the opposite side. Uniform admission to all hollow fibers also in the region of the medium supply is therefore important to avoid channeling within the hollow fiber wound body. To achieve this, the hollow fibers of the hollow fiber wound body are advantageously disposed in groups especially in the region of the medium supply in at least one hollow fiber layer, whereby in this region the interval between the hollow fibers within a group is smaller than the interval between the outer fibers of the adjacent fiber groups. Preferably, however, the flow proceeds transversely around the hollow fibers—thus essentially perpendicular to their longitudinal axis.

When the hollow fiber wound body with hollow fibers is used, for example, for gas separation, for blood plasma recovery, for hemofiltration, for dead-end filtration, for deaerating a liquid, or the like, the hollow fibers of at least one hollow fiber layer can be sealed at one end of the fiber layer.

To even out the flow of a fluid around the hollow fibers of the hollow fiber wound body, a fluid-permeable, more or less stiff or elastic fabric can be disposed between at least one portion of the hollow fiber plies of the hollow fiber wound body.

In addition, the said fabric can be formed so that it removes substances, present in the fluid flowing around the hollow fibers, by absorption or adsorption from the fluid. For example, fibers made of activated carbon or the like are suitable for this purpose.

For the production of the multilayer hollow fiber wound body according to the invention, at least two superposed hollow fiber mats (in which the hollow fibers within each hollow fiber mat are disposed at regular intervals to each other and are held by several inserted transverse fibers or the like, within each hollow fiber mat the regular interval between the transverse fibers or the like is greater than the regular interval between the hollow fibers, whereby the ratio of the regular interval between adjacent transverse fibers within each hollow fiber mat to the regular interval between adjacent hollow fibers within each hollow fiber mat falls in the range of 2 to 40, and none of the hollow fibers has a deflection site) are wound spirally around an axis of rotation, whereby the hollow fibers of adjacent hollow fiber mats are disposed in a mutually crossing manner before winding.

To produce the hollow fiber wound body, different hollow fibers can also be used, whereby different hollow fibers can be disposed also within at least one hollow fiber mat. As has already been set forth extensively above, different signifies different relative to their dimensions, their form, their material, their properties, their function, etc.

At least one fluid-permeable fabric, thus, for example, a nonwoven material, a woven material, a knitted material, a foamed plastic, etc., can be wound together with the hollow fiber mats.

However, just as many, if necessary also different, fabrics as hollow fiber mats can be wound, so that a ply of fluid-permeable fabric is arranged between each hollow fiber ply in the finished hollow fiber wound body. This can possess adsorptive or absorptive properties as already set forth above.

The hollow fiber mats can be produced on a loom or a knitting machine, whereby the transverse fibers holding the hollow fibers at regular intervals to each other can be introduced as filling or warp threads. Naturally, it is also possible to use other agents, for example, in the form of a ribbon or tape to hold the hollow fibers. These can also be disposed as filling or warp threads in a woven or knitted material, or on one side, i.e., only on one side of the hollow fiber mat in each case. In addition, these can act as spacers between adjacent hollow fiber layers.

The use of transverse fibers, however, is preferred, because in this case the linkage between the inserted transverse fibers and the hollow fibers is relatively loose, i.e., not angularly inflexible, so that the relative position of the hollow fibers and the inserted transverse fibers to each other, thus the crossing angle between the two, can be easily altered. This enables a very advantageous production of the hollow fiber wound body and multiple design options of the body, particularly if the starting material is a hollow fiber mat, in which the hollow fibers and the inserted transverse fibers cross essentially at right angles and in which the longitudinal axis of each hollow fiber is disposed first essentially perpendicular to the direction of transport of the hollow fiber mat before winding and parallel to the axis of the rotation of the hollow fiber wound body, as will be described and explained in greater detail below.

Within the hollow fiber mats, both solid fibers and hollow fibers can be disposed at regular or irregular intervals from each other, in the event this were to be advantageous in the production of hollow fiber mats or the hollow fiber wound body or the employment thereof. One portion of solid fibers, however, can also fulfill merely a purely mechanical function, thus, for example, endow the hollow fiber wound body with greater form stability.

In producing the hollow fiber wound body, for each layer with hollow fibers to be formed in a helical shape, a hollow fiber mat with hollow fibers arranged parallel to each other can be used as the starting point in an especially advantageous manner. The longitudinal axis of each hollow fiber is arranged first essentially perpendicular to the direction of hollow fiber mat transport before winding. If one side of the hollow fiber mat is now passed over a longer distance of the transport route than the other side of the hollow fiber mat, then the hollow fiber ends on this one side of the hollow fiber mat lag behind the fibers ends on the other side of the hollow fiber mat. This has the effect that, relative to their original position, the hollow fibers are brought into an oblique position, i.e, form an angle, which is greater or smaller than 90°, relative to the direction of transport. If the hollow fibers are brought into an oblique position in this manner directly before winding relative to the axis of rotation of the hollow fiber wound body, so that they also form an angle with the axis of rotation, then this by necessity produces a helical formation of the affected hollow fibers in winding of the same, e.g., on a core or on the hollow fiber wound body in the process of being formed. For example, each of these hollow fiber mats can be transported before winding first in a plane parallel to the axis of rotation of the hollow fiber wound body, whereby the direction of transport, however, is parallel or oblique, but not perpendicular to the axis of rotation of the hollow fiber wound body. The hollow fiber mat must be deflected for the transport of the hollow fiber mat to finally proceed perpendicular to the axis of rotation of the hollow fiber wound body. If, in so doing, the deflection of the hollow fiber mat before winding occurs in the same plane in such a way that the hollow fiber ends on one side of the hollow fiber mat describe an arc of a circle with a larger radius than the hollow fiber ends on the other side of the hollow fiber mat, then the hollow fiber ends on the larger, i.e., longer, arc of a circle lag behind the hollow fiber ends on the smaller, i.e., shorter, arc of the circle, so that the hollow fibers are brought in this way into an oblique position relative to the axis of rotation of the hollow fiber wound body.

An especially preferred production method is to move each of the hollow fiber mats, designated for hollow fibers to be formed helically, first with hollow fibers disposed parallel to each other and to the axis of rotation of the hollow fiber wound body, perpendicular to their longitudinal axis and thus longitudinal to the axis of rotation of the hollow fiber wound body in a plane parallel to said axis toward the axis of rotation. If one side of the hollow fiber mat is thereby deflected shortly before winding essentially perpendicular to the plane, in which the hollow fiber mat is being transported, for example, by a deflection roller, then the transport distance of the hollow fiber ends, which run over the deflection roller, is greater than that of the hollow fiber ends on the other side of the hollow fiber mat, which do not leave the plane of transport. This deflection creates the situation in which the deflected hollow fiber ends lag behind the other hollow fiber ends, so that the hollow fibers are brought into an oblique position, i.e., into a nonparallel position, relative to the axis of rotation of the hollow fiber wound body.

In hollow fiber mats with hollow fibers not disposed parallel to each other, the assumption of a different form by hollow fibers after winding in the hollow fiber wound body can be achieved in this way; thus they can be formed as helices proceeding in the same direction but differing in the degree of their helical nature, as helices proceeding in the same and/or opposite direction, and as helices which are rectilinear (axially parallel) or proceed in the opposite direction.

The hollow fibers are preferably made of polymers that can be melt spun or regenerated cellulose, whereby the hollow fibers preferably are comprised of a biocompatible material when the hollow fiber wound body is to be used in the medical field.

The transverse fibers or the like or the solid fibers can also be made from a polymer or regenerated cellulose, but also, for example, partially or totally of activated carbon. The surface of the hollow, transverse, or solid fibers can also be coated with sorbents.

FIG. 1 shows in a simplified schematic diagram the structure of a multilayer hollow fiber wound body in cross section. In this case, the hollow fiber wound body consists of a total of two spirally wound hollow fiber mats 1a and 1b, whereby, as indicated by lines 1'a and 1'b, the hollow fiber wound body can have any number of hollow fiber plies. To illustrate the structure of the hollow fiber wound body, hollow fibers 1b are depicted as dark circles. Hollow fibers 1a and 1b are arranged at regular intervals to each other within the layer to which they belong and are held by inserted transverse fibers (not shown). Hollow fibers 1a and/or 1b are formed as helices. Hollow fibers 1a or 1b, however, can also be formed to be rectilinear, thus axially parallel. In each case, hollow fibers 1a cross hollow fibers 1b.

Figure 2:
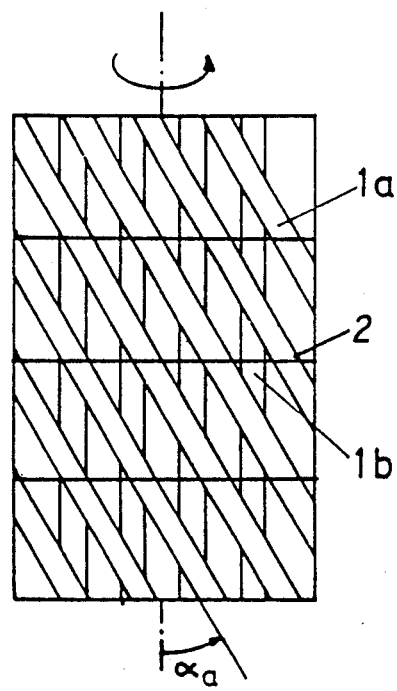
FIGS. 2 to 4 show designs for the hollow fiber wound body.

In the embodiment of the hollow fiber wound body as shown in FIG. 2, hollow fibers 1a are helical, whereas hollow fibers 1b are rectilinear and disposed parallel to the axis. Hollow fibers 1a form the angle alpha-a with the longitudinal axis of the hollow fiber wound body.

Figure 3:
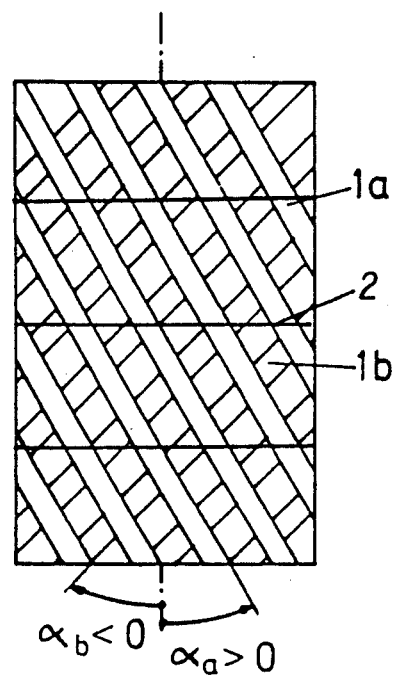

In the embodiment of the hollow fiber wound body shown in FIG. 3, both hollow fibers 1a and hollow fibers 1b are helical, however helical in the opposite direction. Hollow fibers 1a form with the longitudinal axis of the hollow fiber wound body the angle alpha-a, which in terms of the present invention is defined as being greater than 0, whereas hollow fibers 1*b* with the longitudinal axis of the hollow fiber wound body for the angle alpha-b, which by definition is smaller than 0, in the absolute sense, but can be equal to angle alpha-a.

Figure 4:
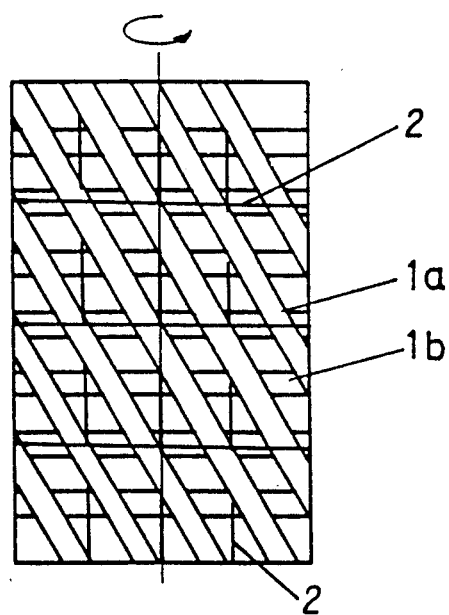
Figure 5:
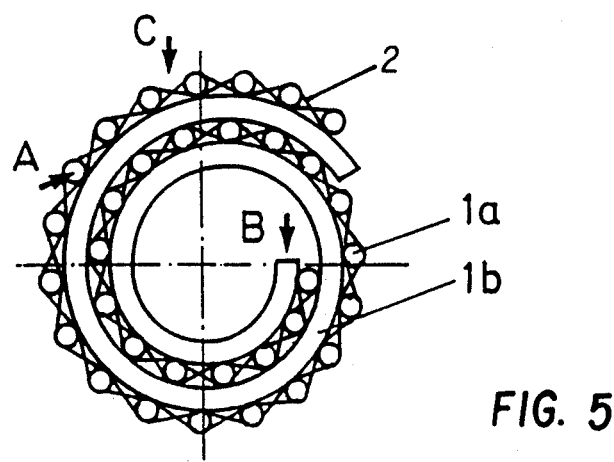
FIG. 5 shows a cross section of the hollow fiber wound body of FIG. 4.

In the embodiment of the hollow fiber wound body shown in FIG. 4, hollow fibers 1*a* are helical and hollow fibers 1*b* are spiral. The structure of the hollow fiber wound body and the design of hollow fibers 1*a* and 1*b* in this embodiment are illustrated in FIG. 5, which shows the hollow fiber wound body in FIG. 4 in cross section. As is illustrated in addition by arrows A, B, and C in FIG. 5, a hollow fiber wound body designed in this manner can be used to allow three media concurrently to participate in a matter and/or heat exchange. In so doing, medium A flows through the helical hollow fibers 1*a*, medium B through the spiral hollow fibers 1*b*, and medium C around hollow fibers 1*a* and 1*b*, whereby its direction of flow proceeds essentially transversely to the longitudinal axis of the hollow fiber wound body.

The inserted transverse fibers or the like are identified by the reference number 2 in the hollow fiber wound bodies shown in FIGS. 2 to 5.

Figure 6:
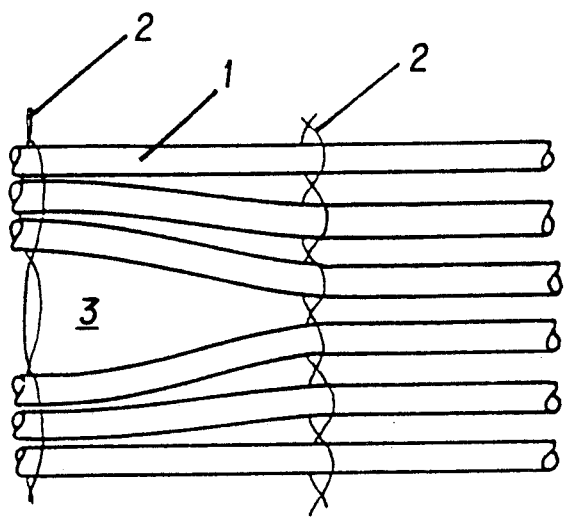
FIG. 6 shows a special hollow fiber configuration.

In the hollow fiber mat shown in FIG. 6, three hollow fibers 1 in each case at the left end of the hollow fiber mat are combined into groups by special disposition of the inserted transverse fibers 2 or the like, whereby within each group the interval between hollow fibers 1 is smaller than the interval between the outer hollow fibers of both adjacent hollow fiber groups depicted. The gap 3, formed by this disposition of hollow fiber ends, between the hollow fiber groups permits better penetration of the medium flowing around the hollow fibers in the hollow fiber wound body. The additional transverse fibers 2 or the like, inserted in the middle of hollow fibers 1 are disposed such that they hold hollow fibers 1 at a regular, essentially identical interval to each other.

Figure 7:
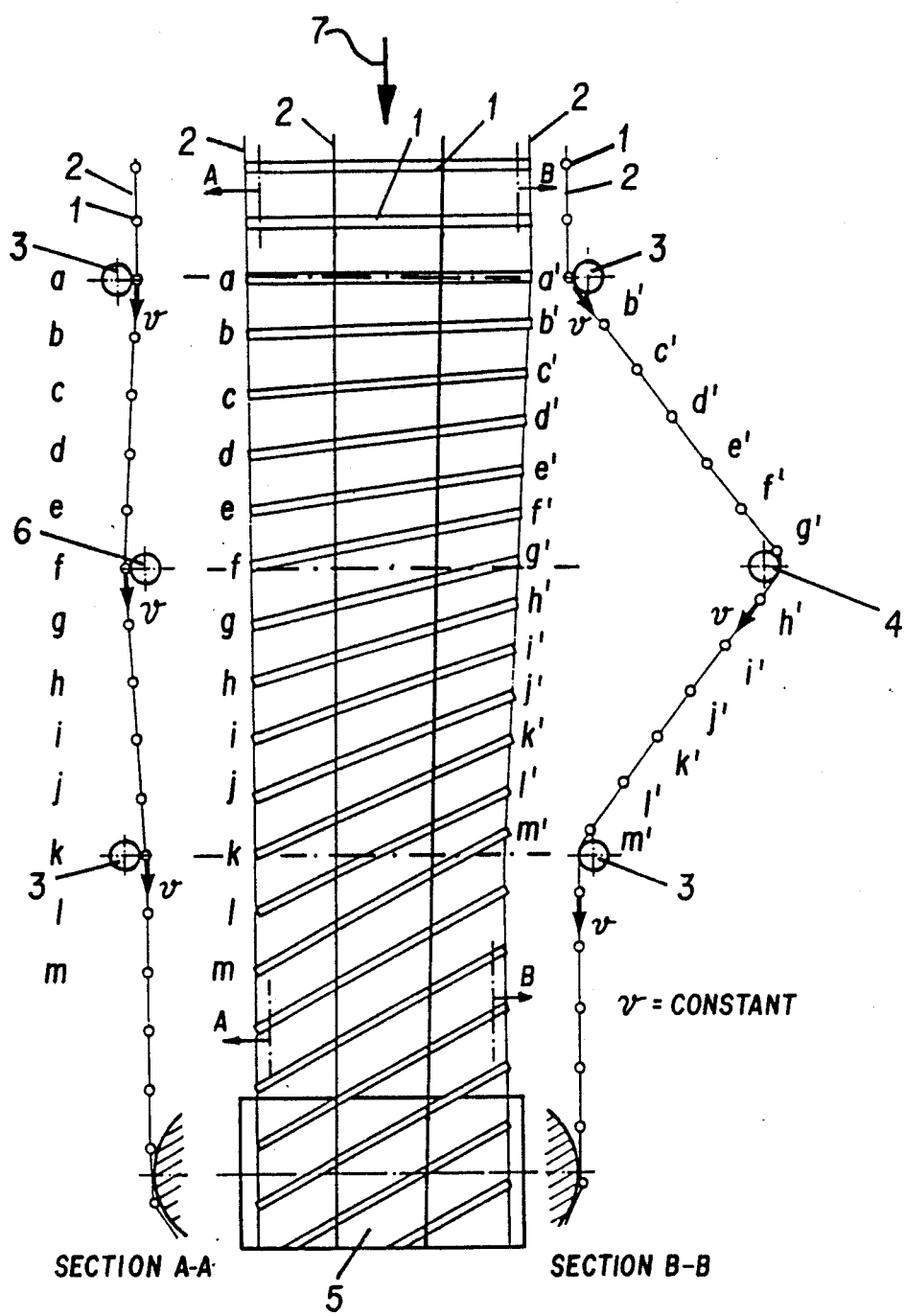
FIG. 7 shows in a simplified schematic diagram, a preferred embodiment of the process for producing the hollow fiber wound body.

An especially preferred embodiment of the process for the production of the hollow fiber wound body is shown in FIG. 7. The mode of action of the process is illustrated by the sections A—A and B—B, whereby a portion of the hollow fiber ends is identified by a, b, etc., to m, and the other ends of the relevant hollow fibers 1 by a′, b′, etc., to m′. The respective position of the hollow fiber ends can be seen both in the plan and also in sections A—A and B—B. For the sake of simplicity, only one hollow fiber mat is shown, which is formed by hollow fibers 1 and the inserted transverse fibers 2 or the like and is wound spirally into hollow fiber wound body 5, in which hollow fibers 1 are disposed helically. Hollow fibers 1 are held by the inserted transverse fibers 2 or the like at a regular interval to each other. First, hollow fibers 1 are aligned parallel to the axis of the rotation, i.e, the longitudinal axis, of hollow fiber wound body 5, thus perpendicular to the conveying direction, indicated by arrow 7, of the hollow fiber mat. The hollow fiber mat in so doing is moved over rollers 3, 4, and 6 at a constant rate onto the axis of rotation of the hollow fiber wound body 5. Whereas the hollow fiber mat on the side with hollow fiber ends a to m essentially experiences no notable deflection on its way to the axis of rotation of hollow fiber wound body 5, the hollow fiber mat on the side with the hollow fiber ends a′ to m′ is passed over deflection roller 4, whereby the hollow fiber ends a′ to m′ cover a longer distance than the hollow fiber ends a to m; for this reason the former lag behind, and therefore are brought into a position that is not parallel relative to the axis of rotation (longitudinal axis) of hollow fiber wound body 5. As FIG. 7 shows in addition, the width of the hollow fiber mat is slightly reduced by the oblique position of hollow fibers 1.

The previously described operation is facilitated if the linkage between hollow fibers 1 and the inserted transverse fibers 2 or the like permits a change in the relative position to each other without kinking of the hollow fibers at this site, i.e., if this linkage is not angularly inflexible. This also applies to the process shown in FIG. 8. As can be derived, moreover, from FIG. 7, the oblique position of hollow fibers 1 immediately before winding can be varied as desired by the degree of deflection with the use of deflection roller 4. In other words, the greater the deflection, the greater the lag of hollow fiber ends a′, b′, etc., and the greater the oblique position of hollow fibers 1, i.e., the greater the angle formed by the hollow fibers 1 with the longitudinal axis (axis of rotation) of hollow fiber wound body 5. The diagram in FIG. 7 shows in addition that an oblique position of hollow fibers 1, the said position being a mirror image of the depicted oblique position of hollow fibers 1, can be achieved by placing deflection roller 6 in a position that corresponds to the depicted position of deflection roller 4 and vice versa. Thereby, that side of the hollow fiber mat on which the hollow fiber ends a to m are located is deflected, but not the side on which the hollow fiber ends a′ to m′ are located, so that the hollow fiber ends a, b, etc., to m experience a lag versus the hollow fiber ends a′, b′, etc. to m′.

To produce a hollow fiber wound body with hollow fibers formed helically in opposite directions and disposed in two spirally wound hollow fiber mats, one can thus begin, for example, with two hollow fiber mats, the hollow fibers 1 of which are arranged parallel to the axis of rotation of the hollow fiber wound body 5 first as depicted in FIG. 1, and the hollow fibers 1 of which are brought into an oppositely running oblique position by the fact that in the one hollow fiber mat the side with the hollow fiber ends a, b, etc., and in the other hollow fiber mat the side with the hollow fiber ends a′, b′, etc., are deflected. It is also possible, however, in the depicted example to deflect the two hollow fiber mats on the same side but to differing degrees. This produces the situation in which the hollow fibers of the hollow fiber mat the side of which is more extensively deflected is brought into a greater oblique position than the hollow fibers of the other hollow fiber mat and the hollow fibers of the two hollow fiber mats thus cross and are formed helically in the same direction in the hollow fiber wound body.

Figure 8:
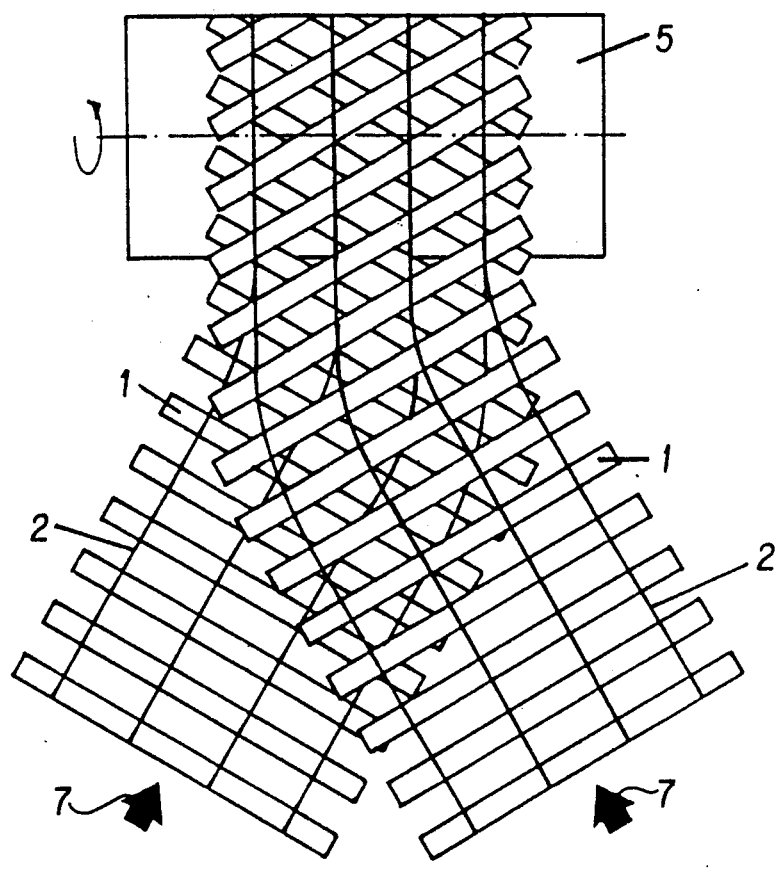
FIG. 8 shows in a simplified schematic diagram, another embodiment of the process for producing the hollow fiber wound body.

Another embodiment of the process is shown in FIG. 8 in a simplified schematic diagram; in the said embodiment, the hollow fiber wound body 5 with hollow fibers 1, formed helically in opposite directions and disposed in two spirally disposed layers, is produced from two hollow fiber mats. Each hollow fiber mat consists of hollow fibers 1 and the inserted transverse fibers 2 or the like. Each hollow fiber mat is transported in a plane parallel to the axis of rotation (longitudinal axis) of the hollow fiber wound body 5, whereby the transport direction indicated by arrow 7 first proceeds obliquely to the axis of rotation of the hollow fiber wound body 5. Immediately before winding of the hollow fiber mat, the said mats are deflected so that the transport of the hollow fiber mats finally proceeds perpendicular to the axis of rotation of hollow fiber wound body 5. The deflection of the hollow fiber mats proceeds in the respective plane in such a way that the hollow fiber ends on the one side of each hollow fiber mat describe a greater and thereby longer arc of a circle than the hollow fibers on the other side of the hollow fiber mats. The hollow fiber ends which describe the outer, and thereby longer, arc of the circle lag behind the hollow fiber ends which describe the inner, thus shorter, arc of the circle, so that the hollow fibers in this way are brought into an oblique position relative to the axis of rotation of the hollow fiber wound body 5, namely the oblique position of the hollow fibers of the one hollow fiber mat is opposite to that of the hollow fibers of the other hollow fiber mat. In this embodiment of the process as well, the oblique position of the hollow fibers can be changed by the degree of deflection of the hollow fiber mats, and a hollow fiber wound body can also be produced with crossing but unidirectionally helically formed hollow fibers.

Figure 9:
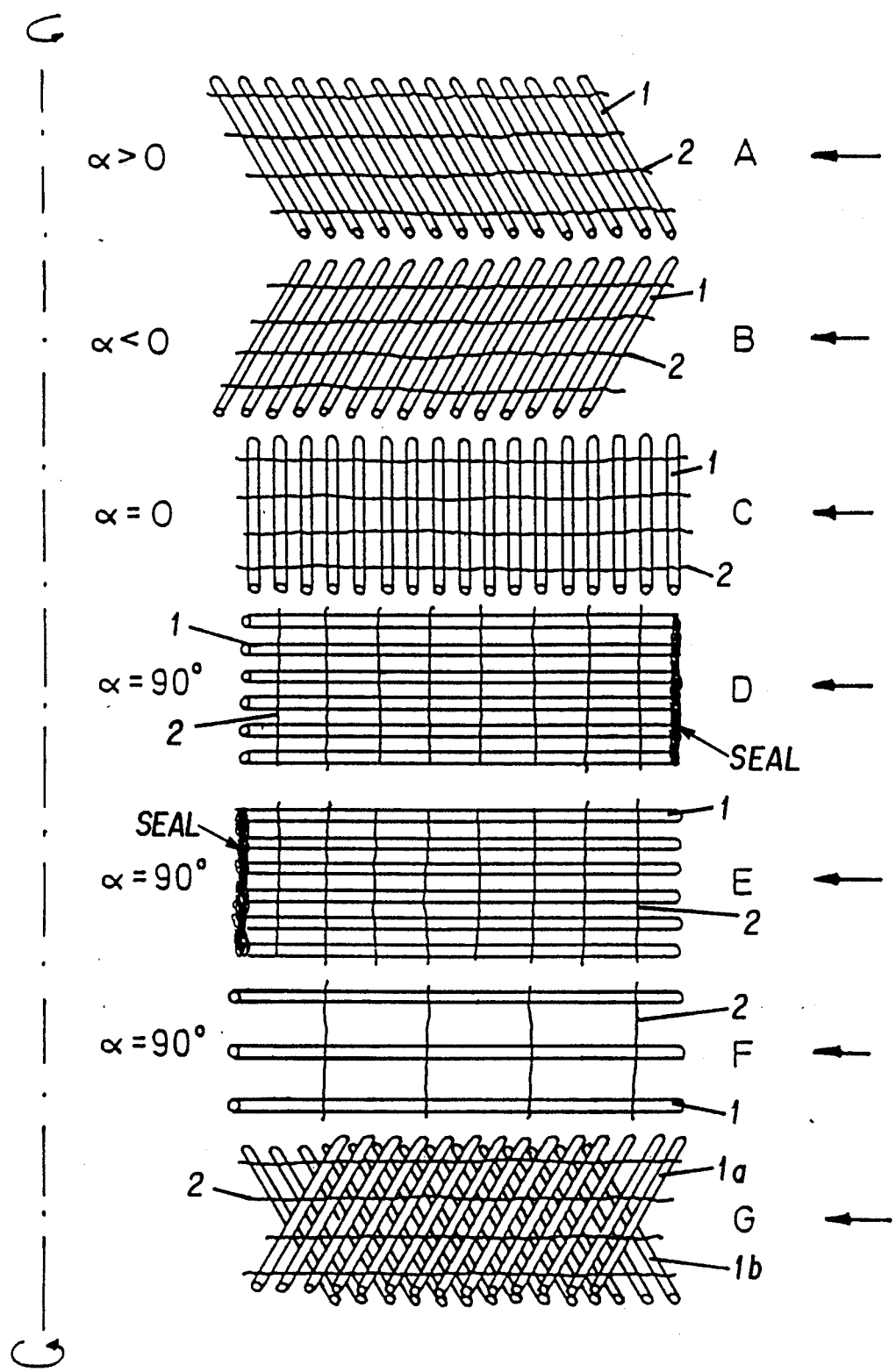
FIG. 9 shows different designs for hollow fiber mats suitable for producing the hollow fiber wound body.

FIG. 9 shows different embodiments of hollow fiber mats A-F, which can be combined according to the invention in any number, but at least two, and wound in a spiral form to produce the hollow fiber wound body. The production of the depicted hollow fiber mats A-F can proceed according to the abovementioned processes but also according to processes according to the state of the art. An extensive description of this process known per se for the production of hollow fiber mats is unnecessary. The axis of rotation of the hollow fiber wound body must be visualized here as indicated, running perpendicular in the picture plane, i.e., the transport of the hollow fiber mat proceeds in the picture plane horizontally (longitudinal axis) of the hollow fiber wound body. Each hollow fiber mat A-B consists of hollow fibers 1 and the inserted transverse fibers 2 or the like, with which they form the angle indicated in each case. Helical (in opposite directions) hollow fibers arise by (concurrent) winding of hollow fiber mats A and B. Rectilinear hollow fibers, running essentially parallel to the longitudinal axis of the hollow fiber wound body, arise by winding of hollow fiber mat C. Winding of hollow fiber mats D to F produces spiral hollow fibers, which are disposed in planes that run essentially perpendicular to the longitudinal axis of the hollow fiber wound body. Hollow fiber mats D and E are hollow fiber mats in which the hollow fibers 1 are sealed on one side. The sealed end of hollow fibers 1 can be disposed along the external perimeter of the hollow fiber wound body or in the interior of the said body.

Example G in FIG. 9 is produced by a combination of hollow fiber mat A (hollow fibers 1a) and hollow fiber mat B (hollow fibers 1b). As will be demonstrated below, there are numerous possibilities for combinations within the scope of the present invention, whereby it must only be considered that the hollow fibers of two adjacent hollow fiber mats or hollow fiber layers be disposed such that they cross. The winding, for example, of a hollow fiber mat D and E or F with the depicted arrangement of hollow fibers 1 would therefore not be included within the invention.

The following combinations listed for the sake of illustration are regarded only as examples and not as limitations.

Possible combinations of hollow fiber mats A to F presented in FIG. 9:

A+B or C or D or E or F
A+B+C or D or E or F
A+B+A+B (optionally, +A+B, etc.)
A+B+C+A+B+C (optionally, +A+B+C, etc.)
B+C or D or E or F
C+D or E or F
C+D+C+E (optionally, +C+D+C+E, etc.)

The advantage of the embodiments shown in FIGS. 7 and 8 of the process for the production of the hollow fiber wound body in particular is the fact that it is possible in this case to process hollow fiber mats immediately after their production, e.g., on a loom or knitting machine into a hollow fiber wound body, whereby the design of the hollow fibers in the hollow fiber wound body in so doing can be altered rapidly and simply without interrupting the process.

Figure 10:
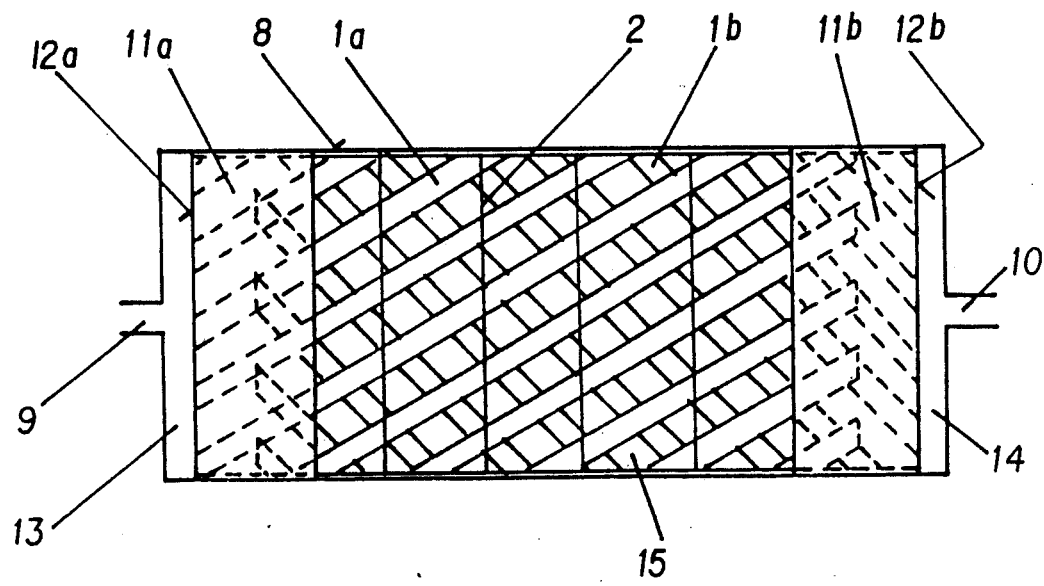
FIG. 10 shows a device with an embodiment of the hollow fiber wound body.

FIG. 10 shows a device in which a hollow fiber wound body is disposed in a housing 8 with connections for fluid 9 and 10. The hollow fiber wound body has hollow fibers 1a and 1b, the end regions of which are respectively embedded in casting material slabs 11a and 11b, whereby the casting material slabs 11a and 11b, respectively, are joined fluid-tight with housing 8. The hollow fiber wound body in addition has the inserted transverse fibers 2 or the like. The hollow fibers 1a or 1b, respectively, are porous, i.e., the sheath (wall) of hollow fibers 1a or 1b, respectively, has open pores penetrating inwardly and outwardly, so that a fluid or only a very specific fluid can pass through the pores. The end regions of the hollow fibers 1a and 1b, respectively, are embedded in casting material slabs 11a and 11b, respectively, such that hollow fibers 1a end at outer surface 12a of casting material block 11a and thus open into chamber 13, whereas their other ends are embedded in casting material slab 11b and thus are sealed. The situation is precisely the opposite for hollow fibers 1b, i.e., hollow fibers 1b end at outer surface 12b of casting material slab 11b and thus open into chamber 14, whereas their other ends are embedded in casting material slab 11a and thus are sealed. This device can thus be used as a type of a two-stage dead-end filter (cascade filter) for filtration or for another form of material separation. The pores of hollow fibers 1a can also possess different pores for this purpose than the pores of hollow fibers 1b. Material separation, however, is also possible with hollow fiber membranes described as nonporous (so-called permeable).

If a fluid is allowed to flow, for example, through the connection for fluid 9 into hollow fibers 1a, then the fluid, the so-called filtrate or permeate, separated totally or partially from some substance, enters through the sheath of hollow fibers 1a into extracapillary compartment 15 and from there through the sheath (wall) of hollow fibers 1b, wherefrom the now twice filtered fluid again leaves the device through chamber 14 and the connection for fluid 10, after another material separation has occurred by passage through the wall of hollow fibers 1b.

The hollow fiber wound body shown in FIG. 10 can be achieved, for example, in that the hollow fiber mat(s) with hollow fibers 1a and the hollow fiber mat(s) with hollow fibers 1b are wound with mutual lateral displacement, so that the ends of hollow fibers 1a protrude on the one side and the ends of hollow fibers 1b on the other side of the hollow fiber wound body. After embedding of the hollow fiber ends, for example, in a curable casting material, after curing of the casting material only so much of the two casting material slabs is removed that only hollow fibers 1a are exposed on the one side and only hollow fibers 1b on the other side, thus the said fibers open into cut surface 12a or 12b.

In the embodiment of the hollow fiber wound body as shown in FIG. 10, hollow fibers 1a are helical and hollow fibers 1b, in comparison with these, helical in the opposite direction. As is evident from the above, this is only one of the possible designs for the hollow fibers and for the hollow fiber wound body.

In another advantageous design, the hollow fiber wound body according to FIG. 10 can also contain solid or hollow fibers, which interact reactively with the fluid in the extracapillary compartment and thus, for example, effect a mass transfer from the fluid and/or into the fluid, a chemical and/or physical alteration of the fluid, or the like. Thus, for example, a blood plasma separation can be effected via porous hollow fibers 1a and plasma purification in the extracapillary compartment, whereby the purified plasma can then again be removed through porous hollow fibers 1b. Fibers effecting a reaction with the fluid in the extracapillary compartment, however, can also be hollow fibers, for example, both ends of which are sealed, e.g., by casting material slabs, and which are filled with a suitable substance.

Figure 11:
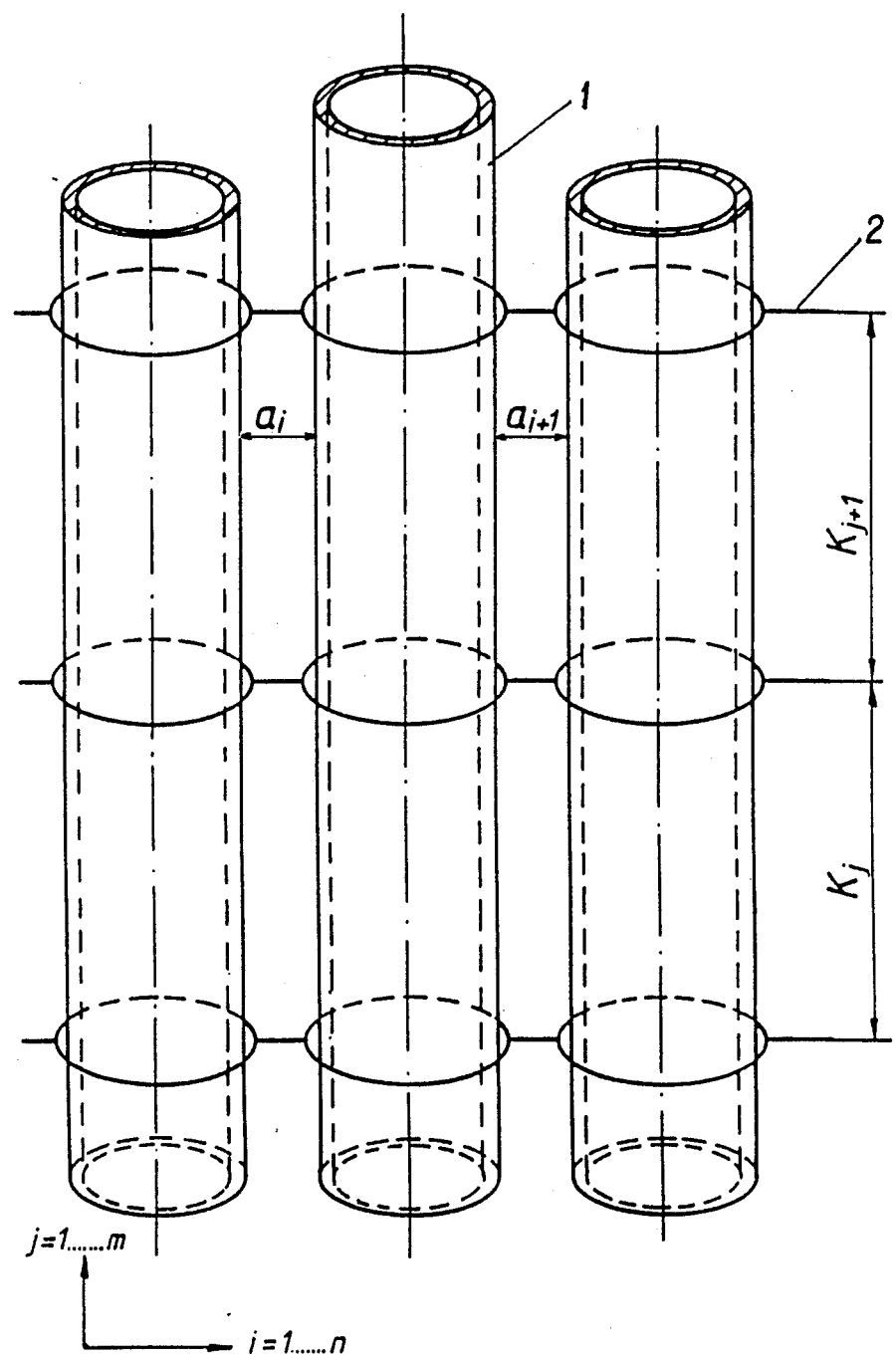
FIG. 11 explains the measuring of the novel range.

FIG. 11 serves to illustrate the method to measure or determine the novel ratios of the regular interval between adjacent transverse fibers 2 within each hollow fiber mat to the regular interval between adjacent hollow fibers 1 within each hollow fiber mat. The regular interval between adjacent transverse fibers 2 is designated with $K_j$, and that of the adjacent hollow fibers 1 with $a_i$. The adjacent interval in each case has the subscript $j+1$ or $i+1$, etc., up to $j=m$ or $i+n$. The regular intervals between transverse fibers 2 or hollow fibers 1 need not be identical to each other, i.e., $K_j$ need not be equal to $K_{j+1}$, etc., and $a_i$ need not be equal to $a_{i+1}$, etc. The intervals that belong together in each case, however, are included in the determination of the interval ratio. Thus, the interval between transverse fibers 2 $K_{j+1}$ and the regular interval between hollow fibers 1 in the region of transverse fibers 2, accordingly $a_{i+1}$ here, are relevant for the calculation.

In the configuration shown in FIG. 11, transverse fibers 2 and hollow fibers 1 form a rectangle at the place of their smallest regular interval, with the shorter side of the said rectangle being $a_{i+1}$ long and the longer side $K_{j+1}$ long. The interval ratio hereby thus corresponds to the ratio of the side lengths of the respective rectangle formed by transverse fibers 2 and hollow fibers 1. The interval region is to be measured differently according to the design, undulations, crimping, etc., of hollow fibers 1, as is possible by simple tests. If the measurements within the novel region are correct, mutual contact between hollow fibers is avoided with certainty with typical hollow fibers suitable for heat and/or mass transfer.

The processing of the hollow fiber wound body into a usable unit, in which the hollow fiber ends are embedded in a casting material slab, can be facilitated by sealing the open ends of the hollow fibers even in the winding of the hollow fiber mats. This can be effected, for example, by welding, by gluing, but particularly by squeezing. To achieve the last mentioned type of sealing of hollow fiber ends, the ends of the hollow fibers of the hollow fiber mats are passed through squeeze rolls before winding, the said rolls which flatten the hollow fiber ends and thereby press them together so greatly that a permanent deformation or even welding of the sheath of the hollow fibers in this region and thereby closure of the hollow fiber ends are achieved. The hollow fiber ends can also be closed by tying with warp threads specifically introduced into this region, or the like.

In the embedding or introduction of hollow fiber ends into a curable casting material, such as for example polyurethane, silicone, or the like, entry of the casting material into the lumen of the hollow fiber is prevented, whereas the entry of the casting material between the hollow fibers, thus into the extracapillary compartment, is promoted. Moreover, the sealing of the hollow fibers, being generally necessary before the embedding or introduction of the hollow fibers into the casting material, for example by wax (so-called waxing) is hereby economically avoided.

The winding of the hollow fiber mats, as set forth above, can proceed on a core, which remains within the hollow fiber wound body. It is also possible, however, to use a core which is removed after the winding of the hollow fiber mats into a hollow fiber wound body.

In using hollow fiber mats, the hollow fibers of which form an angle with the axis of rotation of the hollow fiber wound body, the beginning and/or the end of the hollow fiber mats can be cut parallel to the axis of rotation and the open hollow fibers arising thereby can be sealed thereafter or concurrently, for example, by so-called welding, in which cutting and sealing of the hollow fiber ends occurs in a single operation. As a result, the beginning and/or the end of this hollow fiber mat runs parallel to the winding axis and is not formed as lobes. This can be very advantageous for handling the hollow fiber mats during winding into a hollow fiber wound body and also during unwinding of a hollow fiber wound body, and can facilitate handling. The unwinding occurs, for example, when several smaller hollow fiber wound bodies or other hollow fiber structures are produced from a larger hollow fiber wound body.

The transverse fibers or the other means for keeping the hollow fibers at a regular interval from each other can also be formed by adhesive tape, particularly however by polyurethane cast fibers, which, for example, are formed in that the polyurethane is applied in a pourable state and if necessary between the hollow fibers and then left to cure. This can also occur immediately before the winding.

There is a great advantage, in addition, when the same material is used for the core of the hollow fiber wound body as for the embedding material, e.g., polyurethane, plasticized PVC, and the like. This facilitates the cutting of ends or another form of removing a portion of the casting material to expose and open the hollow fiber ends.

The hollow fibers of the hollow fiber wound body can also be formed in the shape of a U, and the hollow fiber ends accordingly are embedded on the one side. This type of hollow fiber wound body can be used in the employment of suitable hollow fibers, for example, as dead-end filters. It is also possible, however, in this case to permit each of the two ends of the hollow fibers to open into separate chambers and thus enable the flow through the hollow fibers from one hollow fiber end to the other.

In using solid fibers, as set forth in detail above, these can be introduced in addition to the hollow fibers or instead of individual hollow fibers as well, and can also be integrated into the hollow fiber mats.

What is claimed is:

1. A multilayer hollow fiber wound body, comprising at least two superposed hollow fiber mats in the form of a wound body comprising a plurality of hollow fiber plies;

said mats each comprising hollow fibers and transverse fibers, said hollow fibers being held by said transverse fibers and at least one portion of the hollow fibers being formed as helices or spirals on said wound body;

hollow fibers within each said mat being disposed at regular intervals and transverse fibers within each said mat being disposed at regular intervals, a ratio of the regular interval between adjacent transverse fibers to the regular interval between adjacent hollow fibers defining a parallelogram with said adjacent transverse fibers being in the range of 2 to 40;

hollow fibers of a ply of said wound body being disposed so as to cross hollow fibers of an adjacent successive ply of said wound body; and none of said hollow fibers having a deflection site.

2. A hollow fiber wound body according to claim 1, wherein all said hollow fibers are formed as helices.

3. A hollow fiber wound body according to claim 1, wherein the hollow fibers of at least one said mat are disposed helically in a direction opposite to a direction of other said hollow fibers of said wound body.

4. A hollow fiber wound body according to claim 1, wherein at least one of the hollow fibers and the transverse fibers are structured or shaped.

5. A hollow fiber wound body according to claim 1, wherein the hollow fibers of at least one said mat are disposed in groups comprising inner hollow fibers and outer hollow fibers, wherein at least in selected regions the interval between adjacent hollow fibers within a group is smaller than the interval between the outer hollow fibers of adjacent hollow fiber groups.

6. A hollow fiber wound body according to claim 1, wherein solid fibers are disposed in place of a portion of the hollow fibers.

7. A hollow fiber wound body according to claim 1, wherein the hollow fibers of different mats have different properties or functions.

8. A hollow fiber wound body according to claim 1, wherein the hollow fibers of different mats have different dimensions relative to at least one member of the group consisting of internal contour, external contour, wall thickness and length.

9. A hollow fiber wound body according to claim 1, wherein the hollow fibers of different mats have a different cross sectional form.

10. A hollow fiber wound body according to claim 1, wherein the hollow fibers of at least one mat are sealed at least at one end of said at least one mat.

11. A hollow fiber wound body according to claim 1, wherein a fluid-permeable fabric is disposed between at least two plies of the wound body.

* * * * *